F. Baldwin,
Gage Lathe.
No. 106,767. Patented Aug. 30, 1870.
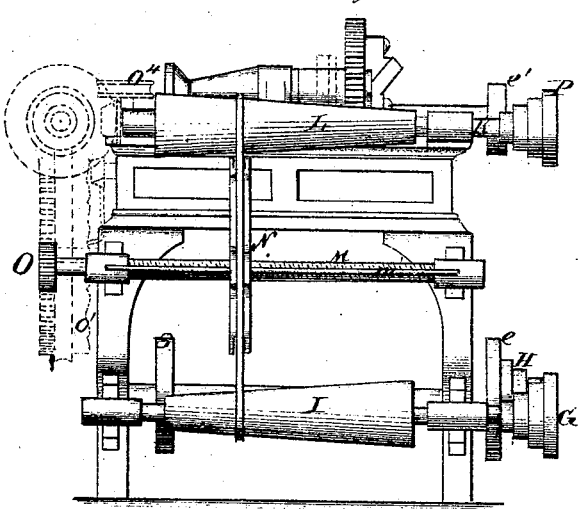
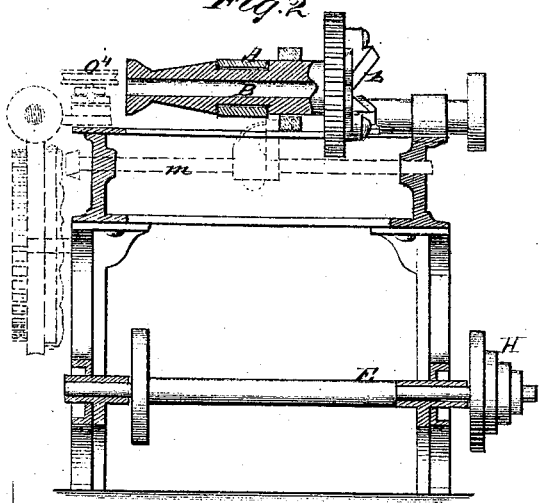
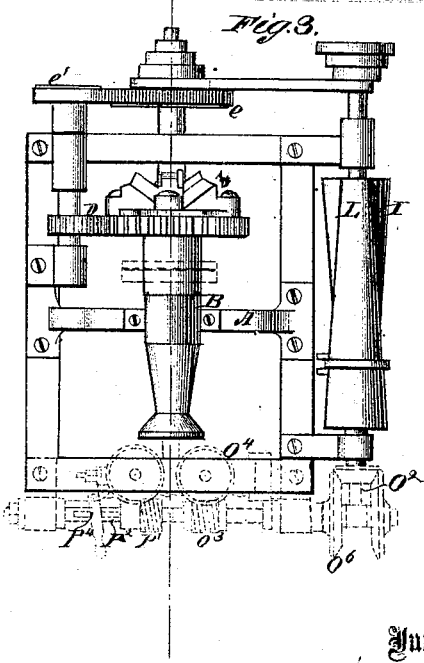
Witnesses:
John Becker
D. S. Mabee
Inventor:
F. Baldwin
per Wm &c.
Attorneys.

United States Patent Office.

FREDERICK BALDWIN, OF JANESVILLE, WISCONSIN.

Letters Patent No. 106,767, dated August 30, 1870.

IMPROVEMENT IN WOOD-TURNING LATHES.

The Schedule referred to in these Letters Patent and making part of the same

*To all whom it may concern:*

Be it known that I, FREDERICK BALDWIN, of Janesville, in the county of Rock and State of Wisconsin, have invented new and useful Improvements in Wood-turning Lathes; and I do hereby declare that the following is a full, clear, and exact description thereof, which will enable others skilled in the art to make and use the same, reference being had to the accompanying drawing forming part of this specification.

This invention relates to improvements in automatic lathes for turning spirally-beaded work, and consists in the attachment to the improved lathe on which patents were granted to me the 24th day of August, 1858, No. 21,240, and the 18th day of June, 1867, No. 65,864, for increasing or diminishing the feed when cutting spirals on tapered sticks, and to vary the pitch of the spirals according to the size, the same being so arranged that the machine may be readily shifted to turn tapered sticks or sticks with uniform diameter throughout, and, when tapered work is produced, the alternate sticks following each other through the mandrel in succession will be worked from the large to the small end, and *vice versa*.

Figure 1 is a side elevation of a part of a lathe of the character referred to, with my improved attachment applied;

Figure 2 is a sectional elevation of the same; and

Figure 3 is a plan view.

The frame is the same as represented in Patent No. 65,864.

On the top of the frame are the cross-bar A and stationary hollow mandrel B.

Around the periphery of the cutter disk C, which runs loosely on this mandrel, is a gear, which gears into a pinion, D, and is driven by a belt passing round a band-wheel on the driving-shaft F, near the bottom of the frame and over a pulley, e, on the same shaft.

On one side of the frame and on the lower part is a shaft, which has a cone of pulleys, G, on one end, which corresponds with another cone, H, on the end of driving-shaft E, and receives its motion from it by means of a belt.

On another portion of this shaft is a long tapering cone or pulley, I.

Directly over this, and near the top of the frame, is another shaft, K, carrying a cone, L, corresponding with this, and on the end of this shaft is a cone of pulleys, P, which correspond with the cone of pulleys H on the driving-shaft E, and receives its motion from it as occasion requires, and which will be hereinafter described.

Between these two shafts, and about equal distance from each, is a screw-shaft, M, carrying a cross-piece, N, which slides on a rod, m, that is fastened to the journal-boxes of this shaft, and running parallel with it, the ends of this cross-piece being forked to admit of a belt passing through them.

On one end of this screw-shaft is a pinion, O, which gears into the pattern-wheel of the patents 21,240 and 65,864, and represented here by dotted lines at O¹.

The size of this pinion and pitch of the screw is such that one revolution of the pattern-wheel carries the cross-piece from one end of the cones to the other.

It will be seen, by passing a belt around these cones and through the forked ends of this cross-piece, on motion being given to the lower cone by a belt from the cone of pulleys on the driving-shaft, that, as the pattern-wheel turns the screw-shaft by means of the pinion O, the motion of the upper cone-shaft will be gradually diminished or increased, according as the pattern-wheel turns one way or the other, and it will be further seen that when this upper cone-shaft is connected with the feed-wheel and pattern-wheel, by means of bevel-gears, and worms, and worm-wheels, shown dotted at o², o³, and o⁴, as represented in patent No. 65,864, that their motion will be also diminished or increased. The object of this will presently be more clearly seen.

The finishing cutter-disk, represented on the drawing at C, carries three, more or less numbers of, cutters b, which are held on dogs or knife-holders, and operated by the pattern-wheel O¹, the same as described in Patent No. 65,864.

On the opposite end of the mandrel is to run loosely another cutter-disk, carrying gouge-knives, the same as represented in Patent No. 21,240, for the purpose of rounding the sticks to be turned and fitting them to the die in the mandrel.

This cutter-disk receives its motion from the pulley S on the driving shaft underneath.

The feed-wheel O⁴ is operated by the worm-wheel O⁵, turned constantly in one direction by the wheel O⁶ gearing with the wheel on the cone-shaft K, having the upper cone L.

The pattern-wheel is turned by the worm P¹ on the shaft P² working in the sleeve O⁵, and turned either way, as it is required to have the pattern turn, the shaft P² being turned either by the wheel O², independently of the wheel O⁶, or by the latter when the wheel O² is unclutched and allowed to run loose.

The shifting of the wheel O², and the connection or disconnection of the shaft P² with the sleeve O⁵ or the wheel O⁶ to change the motion of the pattern-wheel, are effected by the sliding-bar and lever, shown at P⁴.

These feed and pattern-wheel devices are the same as represented in the patents aforementioned, and, not being a new claim, are shown in dotted lines.

The operation for turning a spiral-tapering moulding is as follows:

A pattern being placed on the pattern-wheel, one end being wider than the other, according to the desired taper, the screw-shaft is turned till the belt, passing around the cones, is brought to the small end of the upper cone L. The pattern-wheel is then put in position, so that the rod $m$, resting on the pattern, and which operates the knife-holders to work them in and out on the disk, as in the patent 65,864, rests on the wide end of the pattern, a belt being placed on the cone of pulleys H on the driving-shaft E, and round the cone of pulleys G on the lower cone-shaft I, and a belt is also placed around the band-wheel, at the large end of cone of pulleys on driving-shaft E, and around pulley $e'$ on pinion-shaft, which gives motion to finishing cutter-disk C, and also a belt is placed around the cutter-disk on the other end of stationary mandrel.

The machine is set in motion. A stick to be turned is placed between the feed-wheels, and is carried to the gouge-knives, and is rounded smoothly to a size that fits the die in the stationary hollow mandrel. As it reaches the finishing-knives, or finishing cutter-disk, the pattern-wheel is set in motion, carrying the pattern toward its narrow end, the screw-shaft being also in motion as its pinion gears into the pattern-wheel.

The belt passing round the cones is gradually carried toward the large end of upper cone L, and thus the feed is gradually diminished in size by the pattern.

It will be seen that, by making the finishing-knives the proper shape, any desired form of bead, hollow, round, or molding, can be cut spirally around the stick by placing them in the knife-holders on finishing cutter-disk, and by giving the cutter-disk the proper motion compared with the feed any desired pitch of spiral can be cut.

It will also be seen by this operation that, as the stick is tapered to a smaller diameter, and the feed is diminished, the pitch of the spiral will also be diminished, according to the diameter of the stick.

The next stick is placed between the feed-rolls the same as the first, and, as it reaches the finishing-cutters, the motion of the pattern-wheel is reversed, and also the screw-shaft, and the operation is the same as on the first stick, except that it is turned the other end first.

To turn sticks of the same diameter their whole length, the pattern-wheel stands still, and the belt passing round the long cones is taken off and one placed on the cone of pulleys at the end of driving-shaft and around the cone of pulleys on the upper cone-shaft, and the pinion of the screw-shaft is taken off; and to leave the stick plain at any desired point there is a projection made on the pattern sufficient to throw the finishing-cutters out of the stick; and when it is desired to leave a plain section the pattern is started, and the projection passing the rod marked $m$, which operates the cutters $l$, throws the finishing-cutter out of the stick, and it passes plain the length of the projection on the pattern.

Having thus described my invention,

I claim as new and desire to secure by Letters Patent—

The combination, with the shaft K, pinion $O^3$, wheel $O^6$, worm-wheels $O^3$ and $P^1$, shaft $P^2$, and feed-wheel $O^4$, of the cone-pulleys I L, the belt-shifter N, and the screw-shaft M, the latter being arranged to gear with the pattern-wheel, all substantially as specified.

The above specification of my invention signed by me this 21st day of February, 1870.

FREDERICK BALDWIN.

Witnesses:
CHARLES PENNIMAN,
ALEX. G. DONNELLY.